Figure 1:
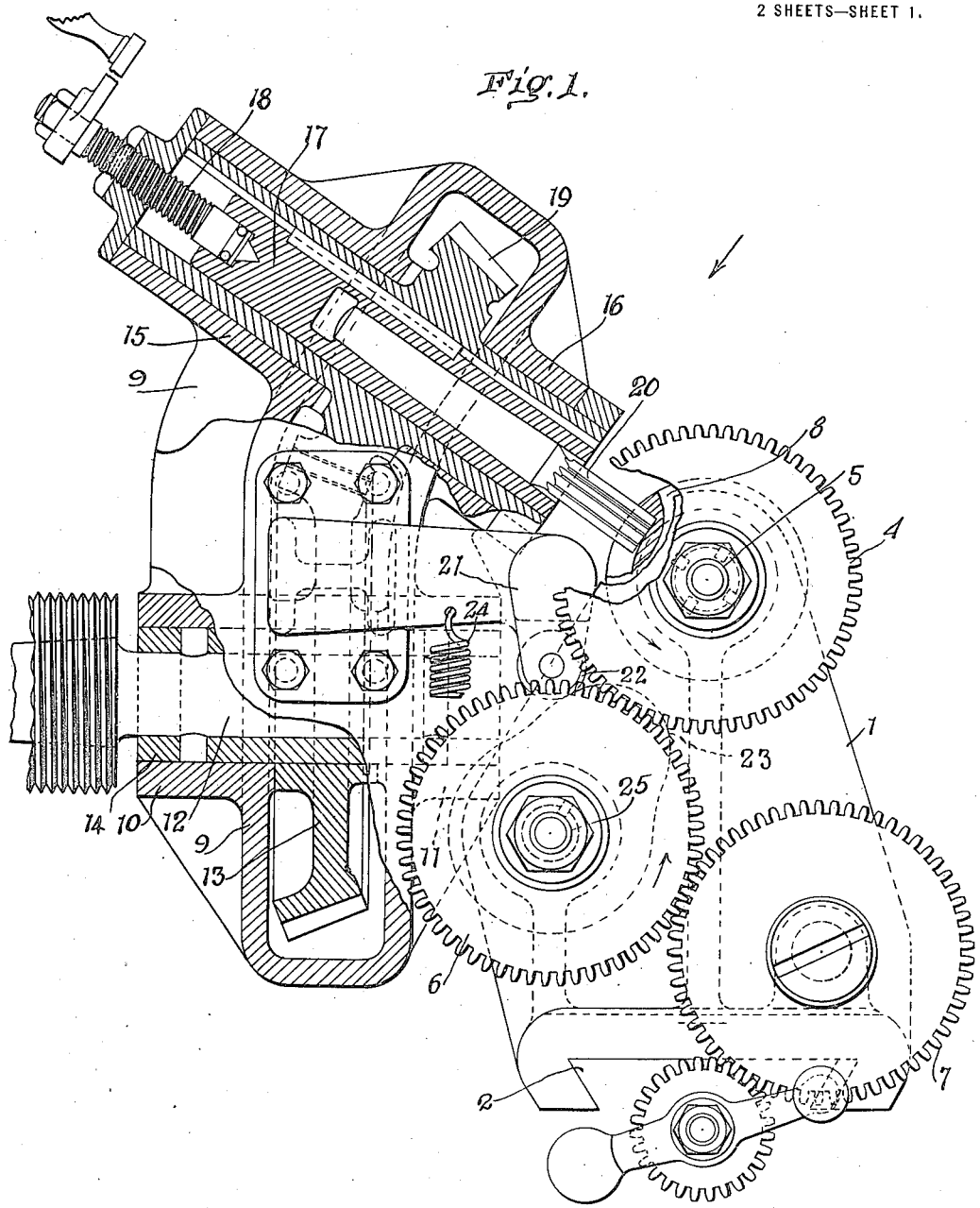

R. C. MITCHELL.
DEVICE FOR CUTTING CAMS.
APPLICATION FILED FEB. 19, 1914.

1,165,617.

Patented Dec. 28, 1915.
2 SHEETS—SHEET 1.

Inventor
Raymond C. Mitchell,

Witnesses

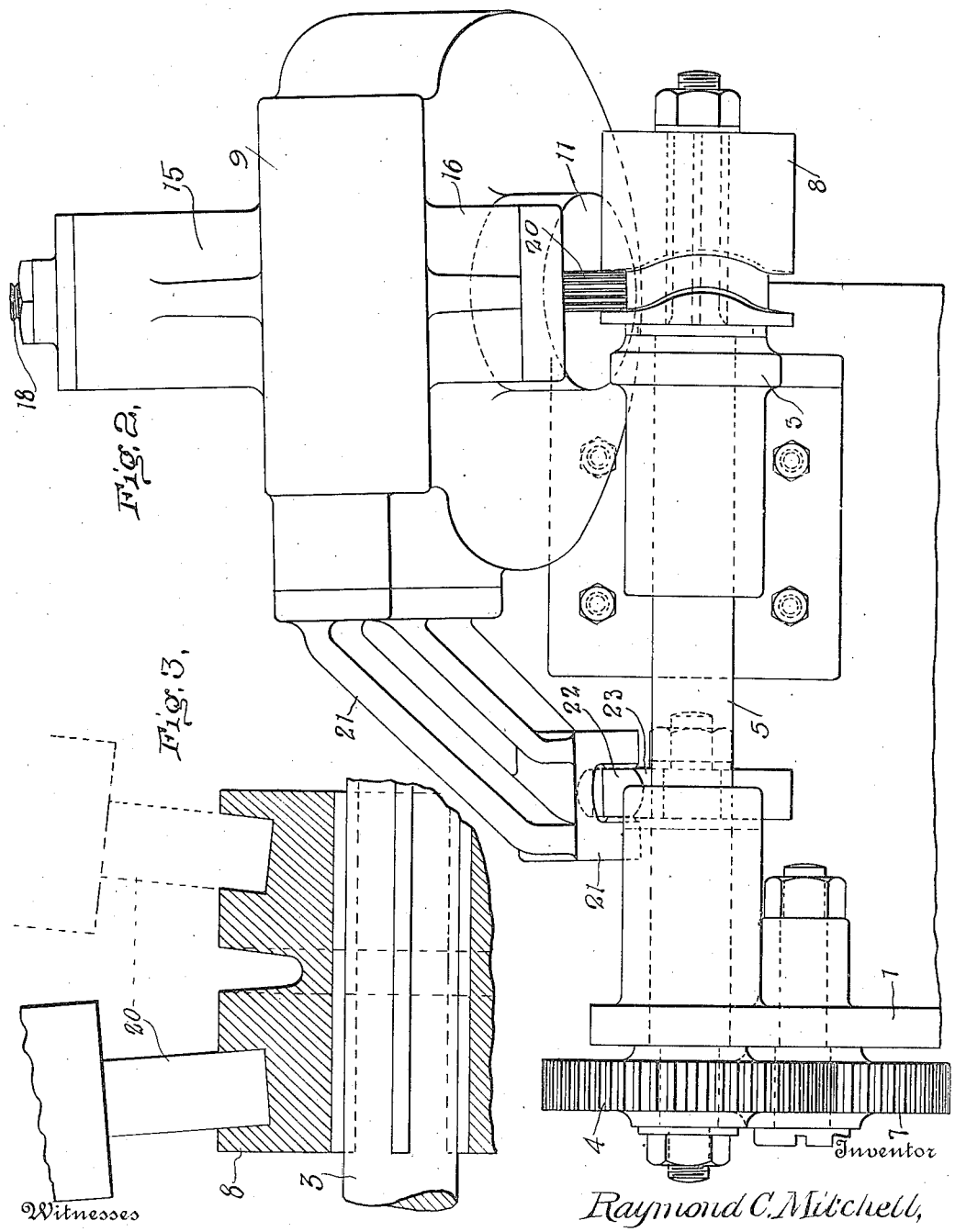

UNITED STATES PATENT OFFICE.

RAYMOND C. MITCHELL, OF SPRINGFIELD, OHIO.

DEVICE FOR CUTTING CAMS.

1,165,617.  Specification of Letters Patent.  Patented Dec. 28, 1915.

Application filed February 19, 1914. Serial No. 819,681.

*To all whom it may concern:*

Be it known that I, RAYMOND C. MITCHELL, a citizen of the United States, residing at Springfield, in the county of Clark and State of Ohio, have invented certain new and useful Improvements in Devices for Cutting Cams, of which the following is a specification, reference being had therein to the accompanying drawing.

This invention relates to a device for cutting cams.

The object of the invention is to provide a device which will be automatically controlled to cause a cam groove to be cut in the desired shape both with relation to its length and to the side walls of the groove. To this end it is a further object of the invention to provide means for so mounting the cutter that it can be simultaneously moved bodily to cause the cut to depart from the line of movement of the work and also can be moved to cause it to extend obliquely to the face of the work, whereby the groove may be curved or otherwise shaped, as desired, and the depth or vertical side walls of the groove may be inclined relatively to the face of the cam.

A further object of the invention is to provide such a mechanism which will be very simple in its construction, and will require no delicate adjustments or complicated mechanism to control the same.

In the accompanying drawings, Figure 1 is an end view, partly in elevation and partly in section, of a mechanism embodying my invention; Fig. 2 is a plan view looking in the direction of the arrow in Fig. 1; and Fig. 3 is a sectional detail view of a portion of the cam and cutter.

In carrying out my invention I utilize a movable work support upon which the work, or blank from which the cam is to be formed, is mounted and which is of such a character that the proper movement, either rotary or otherwise, may be imparted to the work to cause it to move with relation to the cutter. The cutter itself is supported in operative relation with the work so that it will act upon the same to form the cam groove as movement is imparted to the work. The supporting device for the cutter is of such a character that bodily movement may be imparted to the cutter with relation to the work to cause the cut or the groove being formed in the work to depart from the line of movement of the work, thereby giving the proper outline to the groove. The cutter is further capable of movement about a transverse axis to cause it to extend obliquely to the face of the work, thereby causing the walls of the groove to extend at an inclination to the face of the cam. These two movements may be imparted to the cutter in various ways but in the present instance I combine the two movements into a single movement and secure the same by providing a tool holder which may be rocked about an axis and which is of such a character as to support the tool at an inclination to that axis. Preferably, the point of intersection of the axis of the tool holder and of the axis of the tool itself is some distance beyond the working end of the tool. Consequently, when the work holder is rocked about its axis bodily movement will be imparted to the working end of the tool, and at the same time the tool will assume an inclined position with relation to the work.

In the accompanying drawings I have illustrated one embodiment of my invention and have shown the same in the form of an attachment for lathes. As here shown the device is so constructed that the tool holder may be mounted upon the spindle of an ordinary lathe and cutting movement imparted to the cutter from this spindle. The work holder is mounted upon the work support for the lathe and is such as to impart rotary movement to the work, the present mechanism being designed more particularly for cutting a peripheral cam groove in a cylindrical blank. Movement is imparted to the work holder about the axis of the spindle by means of a cam or other device actuated in unison with and preferably directly driven by the driving mechanism for the work holder, thereby enabling the movements of the tool to be accurately timed with relation to the movement of the work.

In the particular embodiment here shown the work holder comprises a frame 1 adapted to be slidably mounted upon the work support of the lathe, as shown at 2, and having mounted therein a chuck 3 or other suitable rotatable support for the work. This chuck is driven by means of a gear 4 mounted on a shaft 5, which also carries the chuck, and meshing with an intermediate gear 6 which, in turn, meshes with a gear 7 which is driven from the usual lathe mechanism or from any other suitable source of power. This driving mechanism may be of any suitable character and is merely for the purpose of imparting rotary movement to the work, which is here shown in the form of a cylindrical blank 8 adapted to have two peripheral grooves cut therein to form a twin cam. The tool holder as a whole comprises a frame or casing 9 having bearings 10 and 11 by means of which it is rotatably mounted upon a shaft or spindle 12 adapted to be connected with the lathe spindle in the ordinary manner and having secured thereto a gear 13. Preferably, but not necessarily, the spindle has bushings 14 pinned thereto and upon which the bearings for the frame are mounted. This frame 9 is also provided with other bearings 15 and 16 in which is adjustably mounted a chuck or tool supporting device 17 adapted to be longitudinally adjusted therein by means of a screw 18 or other suitable adjusting device. This chuck has rigidly secured thereto a gear 19 which meshes with a gear 13 on the shaft 12 and imparts rotary cutting movement to the chuck and to the cutter 20 which is mounted therein. The frame or casing 9 as a whole swings on the bearings 10 and 11 about the axis of the shaft 12 and carries with it the cutter. The construction is such that the cutter is supported with its axis extending at an acute angle to the axis of the shaft 12, the axes of the cutter and the shaft converging in such a manner that they intersect at a point somewhat removed from the end of the tool and, in the present instance, the point of intersection lies on that side of the work opposite the tool, which extends substantially radially to the work. Rocking movement may be imparted to the frame about the axis of the shaft 12 in any suitable manner. In the present instance I have shown the same as provided with an arm 21 having at its end a roller 22 engaging the edge of a cam 23 and held normally in engagement with said cam by means of a spring 24. Rotary movement is imparted to the cam 23 and this movement is preferably timed with relation to the rotary movement imparted to the work. To this end I have, in the present instance, mounted the cam 23 upon a shaft 25 which carries the intermediate gear 6 of the driving mechanism for the work, but it will be obvious that the cam may be driven in timed relation with the work in any suitable manner. The rocking movement which is imparted to the frame or casing of the tool holder causes the cutter to move bodily with relation to the work and consequently causes the cut or groove which is being formed in the work to diverge from a straight line or the line of movement of the work. In the present instance this divergence forms a curve in the cam groove, as shown in Fig. 2. At the same time this rocking movement causes the tool to move about an axis extending transversely thereto and located at the point of intersection of the longitudinal axis of the tool with the axis of the shaft 12. Consequently, the angular relation of the tool relatively to the face of the work or cam blank will be changed, which results in forming the walls of the groove at an inclination to the face of the work or cam, that is, in the present instance, where the work is a cylindrical cam, the cam groove will not be truly radial but will have its walls arranged at a slight angle to the radius of the cam, thus imparting to the cam groove the shape shown in Fig. 3. In this figure the cam shown is a twin cam and the two grooves are identical in shape but are differently arranged in the cam so as to cause the operation of the parts actuated thereby at different times. In this cam the grooves are shown as inclined in opposite directions and both of these inclinations are imparted to the grooves by the movement of the cutter imparted thereto, as above described. When the arm 21 is in engagement with the smallest portion of the cam the cutter will extend at a slight angle to the radius and as the arm rides over the enlarged portion of the cam 23 the cutter is first moved to a true radial position and then beyond this position until it again extends at an angle to the radius but on the opposite side thereof. It will be obvious, however, that the normal position of the cutter and the amount of inclination imparted thereto may be varied according to circumstances.

It is thought the operation of the device will be readily understood from the foregoing description and it will be apparent that I have provided automatically operated mechanism for cutting a groove of the kind described which is exceedingly simple in its construction, has no complicated operating mechanism, requires no fine adjustments and will be absolutely certain in its operation.

While I have shown and described one embodiment of the invention it will be understood that this has been chosen for the purposes of illustration only and that I do not desire to be limited to the details of construction shown and described, for obvious modifications, within the scope of the appended claims, will occur to a person skilled in the art.

Having thus fully described my invention, what I claim as new and desire to secure by Letters Patent, is:—

1. The combination, with a movable work holder, a tool, and means to support said tool in a position to operate on the work carried by said work holder, of means to impart bodily movement to said tool to cause the cut made thereby to depart from the line of movement of said work and to impart movement to said tool about an axis transverse to its length to cause the wall of the cut to extend at an inclination to the face of the work.

2. The combination, with a rotatable work holder, a tool, and means to support said tool in a position to operate upon the circumferential surface of the work carried by said rotatable work holder, of means to impart movement to said tool to cause the cut made in said surface of said work to depart from the line of rotation of said work and to cause the walls of the cut in said surface to extend at an angle to the radius of said work.

3. The combination, with a movable work holder, a tool, and means to support said tool in a position to operate on the work carried by said work holder, of means to automatically alter the position of said tool transversely to the direction of movement of the work to cause the same to be presented to said work in different angular positions relative to the surface thereof without interrupting the operation of said tool.

4. The combination, with a movable work holder, and a tool, of a tool holder having means to support said tool in operative relation to the work on said work holder and capable of movement transversely to the line of cut to alter the angular position of said tool relative to the surface of the work.

5. In a device of the character described, a tool holder comprising a frame mounted to move about a fixed axis, and a tool mounted on said frame with its longitudinal axis arranged at an inclination to the axis about which said frame moves, the axis of the tool and the axis about which said frame moves being in a common plane.

6. In a device of the character described, a tool holder comprising a frame mounted to move about a fixed axis, a tool mounted on said frame longitudinally of and at an inclination to the axis about which said frame moves, means to movably support the work upon which said tool is to operate, and means to move said frame about its axis in timed relation to the movement of said work to cause the tool to be presented in different angular positions relative to the surface of the work.

7. In a device of the character described, a tool-supporting frame mounted for rocking movement, a rotary cutting tool mounted on said frame at an inclination to the axis about which said frame rocks, the axis of the tool and the axis about which said frame moves being in a common plane, a movable work support to move the work into engagement with said rotary tool, and means for causing said frame to be rocked in timed relation with the movement of said work.

8. In a device of the character described, a tool holder comprising a frame movable about a fixed axis and having an arm, a tool supported on said frame longitudinally of and at an inclination to said axis, a movable work support, means for actuating said movable work support, and a cam driven from said actuating means and arranged to engage the arm of said frame to impart rocking movement to said frame.

9. The combination, with a rotary work support, and means for actuating the same, of a tool holder comprising a supporting member mounted on a fixed axis, a tool carried by said supporting member and arranged longitudinally of and at an inclination to said axis, and an operative connection between said supporting member and the actuating mechanism for said work support to impart movement to said tool relatively to said work.

10. The combination, with a rotary work support, and gears for driving the same, of a driven shaft, a gear secured to said shaft, a frame mounted on the axis of said shaft, a tool mounted on said frame at an inclination to the axis of said shaft, a gear connected with said tool and meshing with said first-mentioned gear, an arm secured to said frame, and a cam connected with one of the gears for driving said work holder and arranged to actuate said arm and said frame.

11. The combination with a work holder and a tool, of a tool-holder mounted for rocking movement and having means to support said tool lengthwise of the axis about which said tool-holder rocks, and with its ends spaced away from said axis unequal distances.

In testimony whereof, I affix my signature in presence of two witnesses.

RAYMOND C. MITCHELL.

Witnesses:
 W. W. WITMEYER,
 J. THOS. B. McGREW.